United States Patent
Hines et al.

(10) Patent No.: US 11,589,717 B2
(45) Date of Patent: Feb. 28, 2023

(54) CONSUMABLES MONITORING SYSTEM

(71) Applicant: DEB IP LIMITED, Derbyshire (GB)

(72) Inventors: John Hines, Derbyshire (GB); Dean Philip Limbert, Derbyshire (GB); Paul Dodds, Derbyshire (GB); Christopher Lang, Derbyshire (GB)

(73) Assignee: DEP IP LIMITED

( * ) Notice: Subject to any disclaimer, the term of this patent is extended or adjusted under 35 U.S.C. 154(b) by 275 days.

(21) Appl. No.: 16/465,491

(22) PCT Filed: Nov. 28, 2017

(86) PCT No.: PCT/GB2017/053575
§ 371 (c)(1),
(2) Date: May 30, 2019

(87) PCT Pub. No.: WO2018/100353
PCT Pub. Date: Jun. 7, 2018

(65) Prior Publication Data
US 2019/0335957 A1 Nov. 7, 2019

(30) Foreign Application Priority Data
Dec. 1, 2016 (GB) .................................. 1620423

(51) Int. Cl.
*A47K 5/12* (2006.01)
*B67D 3/00* (2006.01)
(Continued)

(52) U.S. Cl.
CPC .......... *A47K 5/1217* (2013.01); *B67D 3/0093* (2013.01); *G01F 23/20* (2013.01);
(Continued)

(58) Field of Classification Search
CPC .......... A47K 5/1217; A47K 2010/3226; B67D 3/0093; G01F 23/20; H04Q 9/00;
(Continued)

(56) References Cited

U.S. PATENT DOCUMENTS 5,918,197 A 6/1999 Toussant
9,555,429 B2 * 1/2017 Wegelin ................ B05B 12/004
(Continued)

OTHER PUBLICATIONS

PCT Written Opinion and International Search Report for PCT Patent Application No. PCT/GB/2017/053575. 10 Pages.

*Primary Examiner* — Franklin D Balseca
(74) *Attorney, Agent, or Firm* — McAndrews, Held & Malloy, Ltd.

(57) ABSTRACT

A consumables monitoring system is in communication with computing means and has a dispenser assembly formed of a dispenser and a mounting unit. The mounting unit and dispenser are arranged such that a plurality of sensors in the mounting unit is able to measure the quantity of consumables in the dispenser, and the dispenser assembly communicates sensor data to the computing means, which thereby monitor the usage of the dispenser. The plurality of sensors have different sensitivities over a range of inputs, wherein system is configured to switch between the sensors depending on the value of the inputs detected. The fact that the mounting unit may engage multiple different types of otherwise stand-alone dispensers provides for a monitoring system that can be used in conjunction with any type of dispenser and consumable. The plurality of dispensers allows for optimum sensitivity across a broad range of dispenser fill levels.

19 Claims, 3 Drawing Sheets

(51) Int. Cl.
*G01F 23/20* (2006.01)
*H04Q 9/00* (2006.01)
*A47K 10/32* (2006.01)

(52) U.S. Cl.
CPC ....... *H04Q 9/00* (2013.01); *A47K 2010/3226* (2013.01); *H04Q 2209/40* (2013.01); *H04Q 2213/002* (2013.01)

(58) Field of Classification Search
CPC ........... H04Q 2209/00; H04Q 2209/40; H04Q 2209/80; H04Q 2213/002
See application file for complete search history.

(56) References Cited

U.S. PATENT DOCUMENTS

| | | | |
|---|---|---|---|
| 10,156,589 B2* | 12/2018 | Hebiguchi | G01R 19/0092 |
| 2015/0223646 A1* | 8/2015 | Wegelin | A47K 5/1211 222/1 |

* cited by examiner

CONSUMABLES MONITORING SYSTEM

CROSS-REFERENCE TO RELATED APPLICATIONS/INCORPORATION BY REFERENCE

The present application is the U.S. national phase under § 371 of International Application No. PCT/GB2017/053575, having an international filing date of Nov. 28, 2017, which claims priority to GB Patent Application No. 1620423.2, having a filing date of Dec. 1, 2016. Each of the above-mentioned prior-filed applications are hereby expressly incorporated herein by reference in their entirety.

FIELD OF INVENTION

The invention relates to a consumables monitoring system. Particularly, but not exclusively, it relates to a universal system for monitoring the amount of any type of consumables stored in a dispenser in a facilities or services context.

BACKGROUND TO THE INVENTION

In a facility or services context it is known to provide a number of consumables including liquid hand soap, foaming hand soap, alcohol based hand rubs, toilet paper, hand towels, air fresheners, etc. In order to maintain the appropriate level of a given consumable within a particular location (e.g. the amount of soap in a washroom) the level of the consumable must be measured on a periodic basis. Such measurements may be time consuming and furthermore are typically subject to variation based on the person performing the measurement.

Often the suppliers of these consumables to a single facility, or location, are made up from a number of different manufacturers, e.g. in a washroom the paper supplier may not be the same company as the soap supplier, and the maker of a soap dispenser may not necessarily be the same company who supply the soap. This may introduce variations in the measurement of the consumable.

In the prior art conventional consumables monitoring methods require a monitoring system that is physically integrated into a dispenser housing, which results in the need for either multiple separate monitoring systems to cope with the dispensers and consumables of different manufacturers, or for the facility to move the supply of all consumables to a single source.

An object of the present invention is to mitigate some of the deficiencies of the prior art mentioned above.

STATEMENTS OF INVENTION

In accordance with a first aspect of the invention, there is provided a consumables monitoring system comprising a dispenser mounting assembly in communication with computing means, wherein the dispenser mounting assembly comprises a mounting unit, dispenser retainer configured to receive a dispenser, and a sensor, wherein the sensor, mounting unit and dispenser retainer are arranged such that the sensor can monitor the quantity of consumables stored in any dispenser attached to the dispenser retainer, and wherein the dispenser assembly is configured to communicate sensor data to the computing means, and wherein the computing means are configured to monitor the usage of the dispenser assembly using the sensor data, further comprising one or more additional sensors, wherein a plurality of said sensors have different sensitivities over a range of inputs, wherein the dispenser mounting assembly is configured to switch between the sensors depending on the value of the inputs detected.

By directly sensing the quantity of consumables stored in the dispenser and communicating this data to computing means, a single standardised dispenser mounting assembly is capable of working together with a wide range of dispensers of different makes, models and sizes, dispensing any number of different consumables, thereby providing a universal consumables monitoring system and obviating the need for custom monitoring hardware and systems for every distinct dispenser designs, old and new. Further, by providing a plurality of sensors with different sensitives over a range of inputs, the system can ensure optimum sensitivity across a broad range of dispenser fill levels and consumable type, rather than relying on a single sensor having a single optimum range associated with only one type of input.

Preferably, the inputs measured by the sensors are one or more of overall weight of the dispenser and consumables, weight of the consumables held in said dispenser, amount of consumables, fill level of dispenser, type of consumable detected. Accordingly, the system can switch between sensors not only when input value enters the optimum range of one of the sensors (i.e. a particular weight range), but can select the most appropriate sensor for the consumable type detected. The identification of the consumable type can be prompted by the automatic identification of the dispenser or by user input.

In accordance with a second aspect of the invention, there is provided a method for monitoring consumables within a dispenser mounting assembly, said dispenser mounting assembly comprising a mounting unit, dispenser retainer configured to receive a dispenser, and a plurality of sensors, the method comprising the steps of, at the dispenser mounting assembly, measuring via the sensor in the dispenser mounting assembly the quantity of consumable in a dispenser retained in the dispenser retainer, and communicating the sensor data to computing means, wherein the computing means are configured to monitor the usage of the dispenser assembly using the sensor data.

In addition to the advantage described above, the dispenser mounting assembly may be retrofitted into existing monitoring systems, by engaging with dispensers which are already in use and communicating with pre-existing computing means.

Preferably, the communicating step is accomplished via communication means in the dispenser mounting assembly.

By incorporating the communication means into the dispenser mounting assembly, the dispenser mounting assembly can fully integrate into existing dispenser monitoring systems without the need for additional hardware. Further, the dispenser mounting assembly can operate in conjunction with older/simpler dispensers which may not have communication means of their own.

Preferably, the computing means is a remote server.

By transmitting data for offsite analysis, the mounting system need not require integrated computational hardware and can better integrate and make use of any existing computing means and infrastructure that may already be in place at a given site.

Alternatively, the computing means are provided by the dispenser mounting assembly.

Preferably, the computing means comprise a processor in communication with a memory.

In such a case, the dispenser mounting assembly is able to operate independently, providing the universal consumables monitoring system without the need for any other infrastructure. This is especially advantageous for isolated, standalone applications.

Preferably, the method further comprises the step of calibrating the sensor, wherein the output of the sensor is calibrated to the amount of consumables stored in the dispenser.

Having a direct functional relationship between sensor data and actual logistics data enables the consumables monitoring system to provide a clear output of real-world significance to a user.

Preferably, the calibration step comprises taking a reading from the sensor when the dispenser is empty of consumables, taking a reading when the dispenser is full of consumables and applying an interpolation so as to enable the mounting plate to determine the amount of consumables stored in the dispenser from the output of the sensor.

This calibration method allows for the consumables monitoring system to be calibrated quickly and simply by a user installing the dispenser, bypassing the need for any additional calibration software.

Preferably, the calibration step comprises reading existing calibration data from memory within the dispenser mounting assembly.

This obviates the need for any initial setup calibration, thereby reducing the chance of miss-calibration as a result of human error.

Preferably, the calibration step comprises receiving calibration data from remote computing means.

This enables all calibration data to be stored and accessed remotely, bypassing the need for databanks within the dispenser assembly itself. Further, then allows for the sensor calibration to be updated remotely over time, allowing for the compensation of long term drift in the output of the sensor, without the need to re-visit and service the dispenser assembly.

Preferably, the method further comprises the step of identifying the type of dispenser held by the dispenser mounting assembly and looking up associated calibration data.

This step allows for the system to self-determine the calibration data appropriate for the dispenser paired with the dispenser mounting assembly, further reducing the chances and consequences of miss-installation or an erroneous setup.

Preferably, identifying the type of dispenser is accomplished by detecting the weight of the dispenser when empty of consumables.

By keeping a record of known dispenser weights, either locally or remotely, the consumables monitoring system is not only able to identify the correct dispenser and the appropriate calibration data, but can also identify the dispenser independently of the exact consumables which are subsequently stored. In the case of dispensers which may be used to dispense multiple types of consumables, each type with its own calibration data for a particular dispenser, the monitoring system is able to identify both separately and thereby select the correct calibration.

Alternatively, identifying the type of dispenser is accomplished by reading identification means on the dispenser.

This enables a dispenser to be identified independently of the weight of any stored consumables. Further, with the dispenser independently identified and having a known weight when empty, a measurement of the weight of the dispenser provides for a measure of the consumables stored within.

Preferably, the identification means comprise at least one of an RF transmitter, serial number or barcode.

Preferably, the dispenser mounting assembly polls the sensor at regular intervals for an updated reading of the amount of consumables stored in the dispenser.

This enables data to be collected regularly regarding the state of the dispenser and the consumables within, without draining power by being constantly active. Furthermore, this data gathering can take place independently of external management, allowing for data collection to continue unsupervised or at periods of when external connectivity is limited or disabled.

Preferably, the computing means prompt the dispenser mounting assembly to poll the sensor for an updated reading of the amount of consumables stored in the dispenser.

This enables remote control of the monitoring system. Further, by only collecting data when the computing means are ready to receive it, the reliance on local data storage is reduced.

Preferably, use of the dispenser prompts the dispenser mounting assembly to poll the sensor for an updated reading of the amount of consumables stored in the dispenser.

Accordingly, the data is only collected when the amount of consumables is likely to change, thereby saving energy by reducing the number of unnecessary measurement and transmission events.

Preferably, the method further comprises the step of indicating, via the communication means, when the weight of consumables stored in the dispenser drops below a first threshold, or is above a second threshold.

This information may be transmitted locally to indicate the status of the consumables to a user of the dispenser or to a custodian, thereby prompting a refill event. It may also be transmitted to a centralised monitoring system where it may be used to trigger the ordering of replacement supplies to a store, or to trigger a visit from a custodian.

Preferably, the method further comprises the step of associating a change in the output of the sensor with a dispenser usage event.

By resolving individual usage events, the monitoring system is able to track dispenser usage by measuring the amount of consumables alone, without the need of additional sensors (on the dispenser operation means for example). Further, by comparing the measured quantity of consumables before and after a single usage event, the monitoring system is able to track the quantity of consumables dispensed during that one event.

Preferably, the method further comprises the step of associating a change in the output of the sensor with a dispenser refill event.

In such a case, the monitoring system is able to self-determine that the dispenser has been refilled from consumables and need not rely on external inputs informing it of such.

Preferably, the method further comprises the step of associating a change in the output of the sensor with a partial dispenser refill event.

Again, the sensor is able to self-reliantly maintain accurate records of consumable usage and re-stocking interactions.

Preferably, the method further comprises the step of associating a change in the output of the sensor with removal of the dispenser from the dispenser mounting assembly.

This allows the monitoring system to monitor potential periods of down time, or track a potential tampering/theft of the dispenser.

Preferably, the method further comprises the step of storing a log of such events in the memory of the dispenser mounting assembly.

Keeping a local record of events allows for data to be recorded during periods when no connection is available to any remote part of the monitoring system. This on-board database may also serve as a backup.

Preferably, the method further comprises the step of transmitting, via the communication means, the log of such events to the computing means.

Preferably, the method further comprises the step of resolving the change in weight of consumables stored in the dispenser associated with a single usage event.

By measuring how much of the consumables are dispensed in a single use, the monitoring system can correlate dispenser use with changing consumable weight.

Preferably, the method further comprises the step of estimating the number of remaining usage events before the weight of consumables stored in the dispenser drops below a first threshold.

This allows the monitoring system to know when the consumables in the dispenser are a few usage events away from being depleted.

Preferably, the method further comprises the step of estimating the frequency of usage events based on historical usage data or data stored in memory.

This allows the monitoring system to predict the point at which the dispenser is empty of consumables, and forecast a desired refilling event.

Preferably, the method further comprises the step of estimating the amount of time before the weight of consumables stored in the dispenser drops below a first threshold.

Accordingly, a refill event can be scheduled to ensure that the dispenser is never entirely empty of consumables, whilst at the same time ensuring unnecessary refill events are avoided.

In accordance with a third aspect of the invention there is provided a dispenser mounting assembly for a dispenser of consumables, the dispenser mounting assembly comprising a mounting unit for attaching the assembly to a surface, dispenser retainer configured to receive a dispenser, and a plurality of sensors, the mounting unit comprising guidance and retention means for operably engaging the dispenser retainer, wherein the sensor, mounting unit and dispenser retainer are configured such that the combined mass of the dispenser retainer and any dispenser attached thereto is measured by the sensor.

This dispenser retainer ensures the dispenser and dispenser mounting assembly are correctly arranged, with the sensor being able to measure the weight of the consumables within the dispenser. Further, the dispenser retainer may be designed with one portion to engage with a particular type of dispenser, and another portion to engage with the mounting unit. This allows the mounting unit to remain standardised.

Preferably, the sensor is one of a force sensing resistor, strain gauge, load cell, spring switch.

These sensors provide a measured response to changes in the weight of the consumables stored with the dispenser and may be selected for the sensitivity over a particularly appropriate weight range or their reliability and cost. As will be appreciated by the skilled person, any means suitable for monitoring the changing quantity of the consumables within the dispenser may be employed.

Preferably, the sensor is mounted on the mounting unit. This allows the sensor to be used with any suitable dispenser retainer.

Alternatively, the sensor is mounted on the dispenser retainer. This enables the sensor to be in direct contact with the dispenser Preferably, the dispenser retainer is sized such that the dispenser is completely contained within the extents of the dispenser retainer.

This ensures the dispenser housing is unable to interfere with the weighing operation of the mounting plate.

Preferably, the dispenser mounting assembly further comprises communication means.

By providing communication means within the dispenser mounting assembly, the dispenser assembly is able to operate with existing dispensers which may not themselves have communication means. Further, the communication means allow the dispenser assembly to form part of a wider consumables monitoring system.

Preferably, the communication means comprise an RF transceiver.

Preferably, the display assembly further comprises a display for visually indicating the level of consumables in the dispenser.

This enables the dispenser assembly to communicate to both local user and custodians, as well as providing display means to a dispenser which may not necessarily have such means of their own.

Preferably, the display assembly further comprises a user input for indicating a type of recent event, or a stage in a calibration process.

This facilitates local operation of the dispenser assembly.

Preferably, the dispenser mounting assembly further comprises one or more additional sensors having varied sensitivity over a range of inputs, wherein the dispenser mounting assembly is configured to switch between the sensors depending on the inputs detected.

This ensures that the data regarding the quantity of consumables stored within the dispenser is accurately determined as it varies from a full state to an empty state. Further, multiple sensors provides for sensor redundancy and cross-checking of data.

In a further embodiment there is provided a method for monitoring consumables within a dispenser mounting assembly, said dispenser mounting assembly comprising a mounting unit, dispenser retainer configured to receive a dispenser, and a sensor, the method comprising the steps of: at the dispenser mounting assembly, measuring via the sensor in the dispenser mounting assembly, the quantity of consumable in a dispenser retained in the dispenser retainer; communicating the sensor data to computing means, wherein the computing means are configured to monitor the usage of the dispenser assembly using the sensor data; further comprising the step of calibrating the sensor, wherein the output of the sensor is calibrated to the amount of consumables stored in the dispenser, wherein the calibration step comprises reading existing calibration data; identifying the type of dispenser held by the dispenser mounting assembly and looking up associated calibration data and identifying the type of dispenser.

Preferably wherein the identification of the type of dispenser is accomplished by detecting the weight of the dispenser when empty of consumables; or reading identification means on the dispenser; or wherein the identification means comprise at least one of an RF transmitter, serial number or barcode.

Other aspects of the invention will be apparent from the appended claim set.

BRIEF DESCRIPTION OF THE DRAWINGS

Embodiments of the present invention will now be described, by way of example only, with reference to the accompanying drawings, in which.

DETAILED DESCRIPTION OF AN EMBODIMENT

In order to provide a consumables monitoring system capable of monitoring the usage and fill level of a range of dispensers stocking a range of consumables, there is provided a consumables monitoring system 1 in accordance with an embodiment of the present invention.

Figure 1:
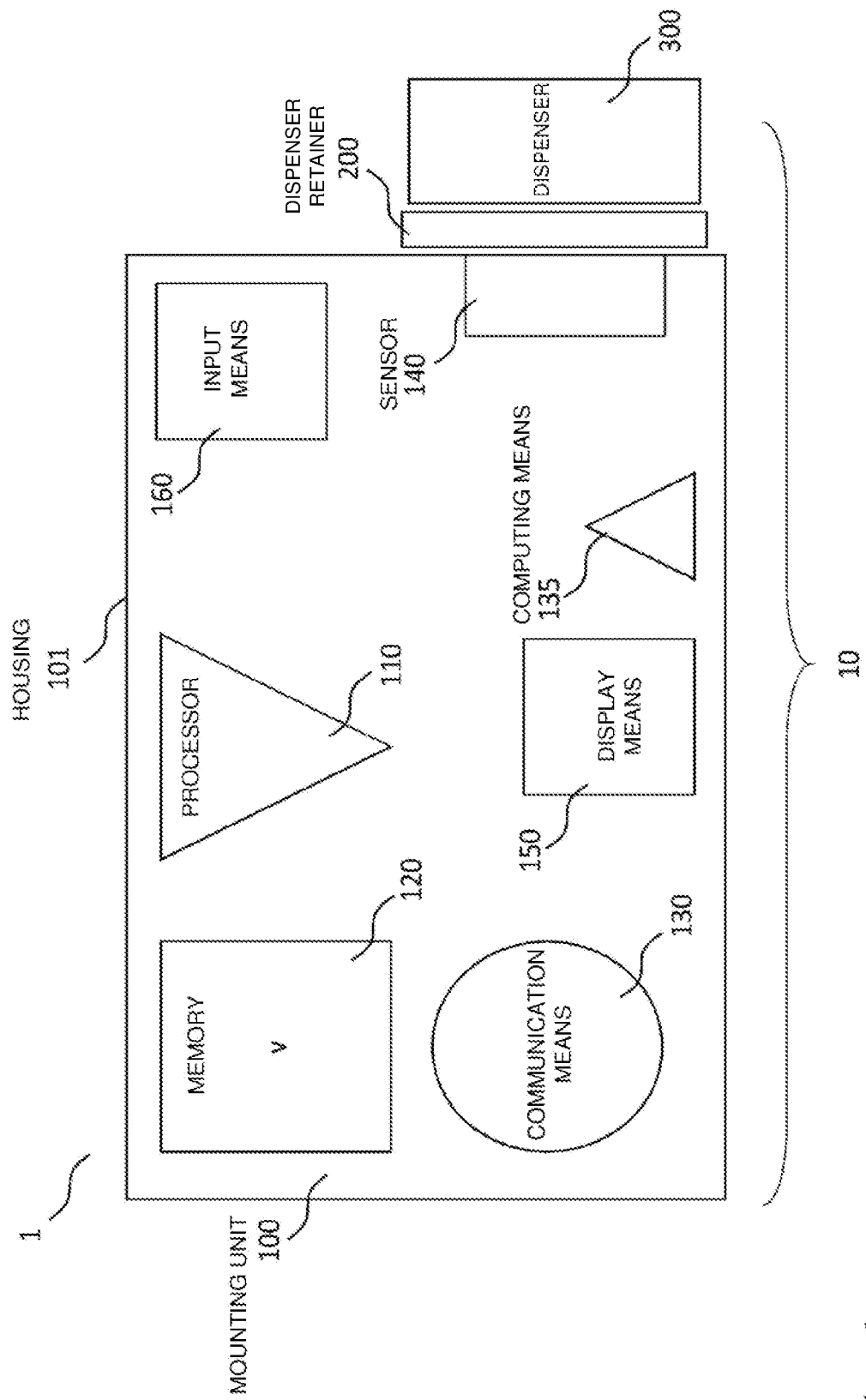
FIG. 1 is a schematic of a consumables monitoring system in accordance with an embodiment of the invention.

FIG. 1 shows a schematic of a dispenser assembly 10 which forms part of the consumables monitoring system 1 and comprises a mounting unit 100, dispenser retainer 200 and a dispenser 300. Though the dispenser 300 is referenced in order to better describe the operation of the consumables monitoring system 1 on the dispenser 300, it should not be considered as an essential element of the consumables monitoring system 1.

The mounting unit comprises a housing 101 in which there is at least a processor 110, memory 120, communication means 130 and a sensor 140.

The mounting unit 100 is configured to engage with the dispenser 300 via the dispenser retainer 200 (which are described in detail in relation to FIG. 2), with the sensor 140 positioned so as to be sensitive to the quantity of consumables stored within the dispenser 300.

The sensor is in communication with the processor 110, which is in turn in communication with the memory 120 and the communication means 130.

The sensor 140 is a known sensor and is configured to measure the quantity of consumables stored within the dispenser 300. In a preferred embodiment, the sensor 140 is sensitive to the weight of the consumables stored within the dispenser 300. As such the sensor 140 is provided, in an embodiment, by one or more of a force sensing resistor, strain gauge, load cell or a spring switch or any other suitable means.

The processor 110 is configured to receive data from the sensor 140 and from this data the processor 110 is configured to determine the quantity of consumables stored within the dispenser. The processor 110 is configured to utilise the data recorded by the sensor 140 to produce the quantity data via a calibration process. In an embodiment the calibration process involves identifying the dispenser (and thus the consumable type) and looking up the appropriate calibration data stored in memory 120. In a further embodiment, the sensor 140 is sensitive to the overall weight of the dispenser 300 including both the consumables within the dispenser 300 and the dispenser 300 itself. Thus, in an embodiment, the sensor 140 can determine the dispenser type by detecting the weight of an empty dispenser 300. In an alternative embodiment, the dispenser 300 is identified by an RFID chip located on or within the dispenser 300 that is read by the processor 110. In such an embodiment, the base weight of the dispenser 300 can be accessed from memory along with the corresponding calibration data. Accordingly, the sensor 140 is able to determine the fill state of the identified dispenser 300.

The processor 110 is further configured to query the sensor 140 at regular intervals in order to determine the weight of consumables in the dispenser 300. As such, any suitable means for determining the quantity of the consumables in the dispenser, and measuring a change in this quantity, may be used.

The mounting unit 100 further comprises a form of memory 120, preferably non-volatile memory, and the processor 110 is configured to write data, such as the sensor output or the calculated quantity of consumables to the memory 110.

In an embodiment, the housing further includes computing means 135. In an alternative embodiment, computing means 135 may be provided by a remote server (not shown). In such a case, the monitoring system 1 is provided by the cooperation of the dispenser assembly 10 and the remote server. In a further embodiment, both internal and remote computing means 135 may be used in tandem.

The communication means 130 are known communication means and are used to transmit information regarding the dispenser assembly 10 to any external portions of the consumables monitoring system 5, such as, in one embodiment, computing means 135. In an embodiment, the communication means 130 are used to transmit raw sensor data as soon as it is measured. In a further embodiment, the communication means 130 transmit data regarding the quantity of consumables once it is calculated by the processor 110. The communication means 130 may transmit data as soon as it is available, at regular intervals, or when prompted by an external signal, which may in turn be generated by computing means in an embodiment in which these are provided externally to the dispenser assembly 10.

Optionally, the housing further includes one or both of display means 150 and input means 160 located on the external surface of the housing so as to be usable when the mounting unit 100 engages with the dispenser 300. The display means 150 allow commands and other information to be communicated to a user or a custodian. The display means 150 in an embodiment is a display screen such as an LCD screen. In further embodiments any other known suitable means of display are used. The input means 160 is an actuation means, which in a preferred embodiment is a button. In further embodiments the user input means is an alphanumeric keypad, with which the user may input one or more commands. As such any known suitable means for enabling a user to input a command to the mounting unit 100 may be employed. Such user input means 160 are known in the art.

Figure 2:
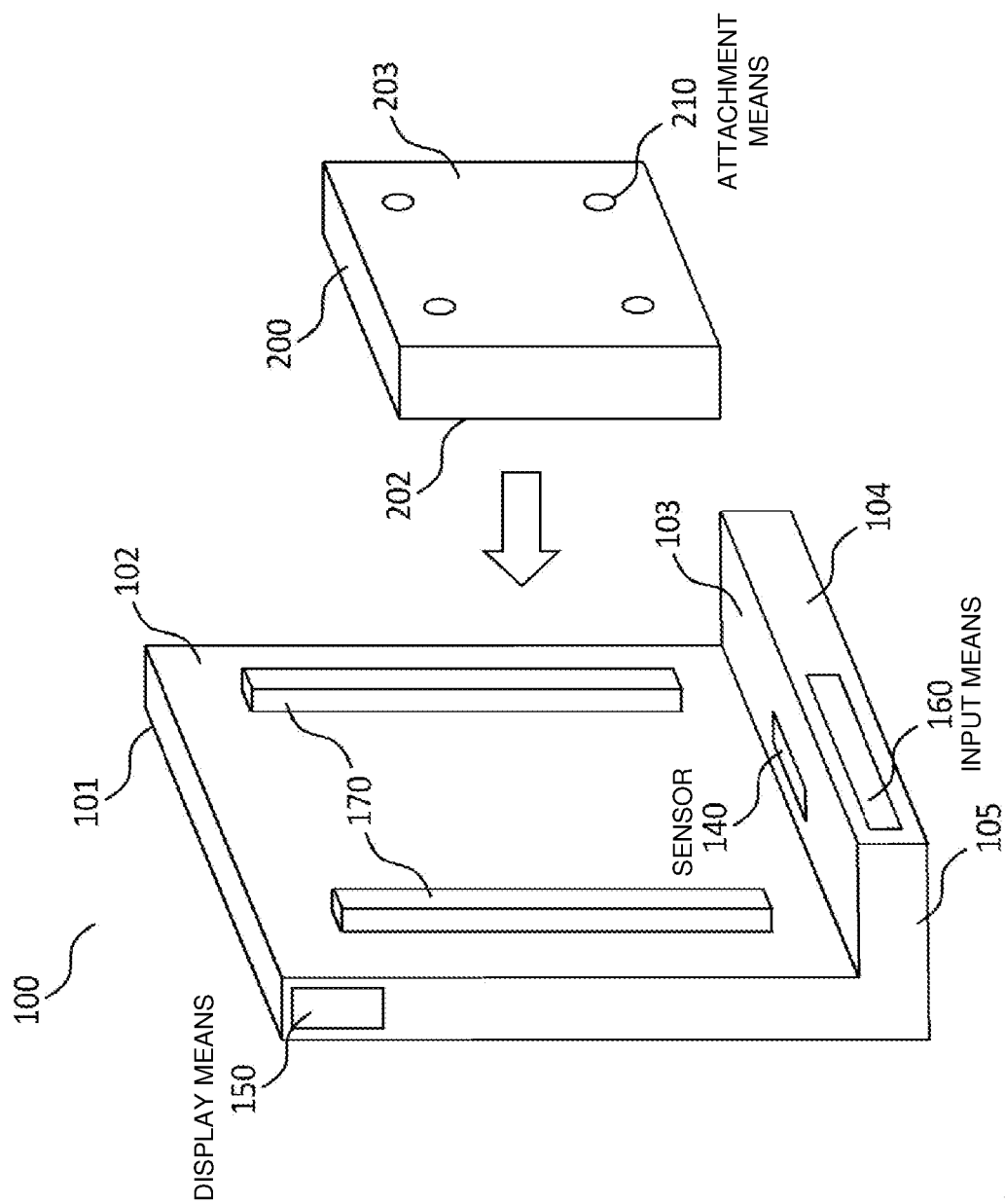
FIG. 2 is a perspective view of a dispenser mounting assembly in accordance with an embodiment of the invention.

FIG. 2 shows a preferred embodiment in which the housing 101 is a rugged housing having guidance and retention means 170 on engaging face 102.

Also shown is separable dispenser retainer 200 having a mounting unit engaging face 202 and dispenser engaging face 203. Face 203 has attachment means 210 for securing a dispenser 300 (not shown).

FIG. 2 further depicts the sensor 140 on exterior surface 103 of the mounting unit housing 101, such that when the dispenser retainer 200 is engaged by guidance and retention means 170, the sensor 140 is positioned relative to the dispenser retainer 200 and dispenser 300 (not shown) so as to be sensitive to the weight of the dispenser 300 and any consumables within. In an embodiment, the weight of the dispenser retainer 200 is known, such that the sensor output can be corrected to account for the dispenser 300 only.

In an embodiment, the sensor 140 is located on dispenser retainer 200, such that when the mounting unit 100 engages the dispenser retainer 200, the sensor is forced down onto a portion of the mounting unit 100 and is sensitive to the combined weight of the dispenser retainer 200 and any dispenser 300 attached thereto.

Display means 150 and the input means 160 are located on exterior surfaces 104 and 105 of the housing 101, such that they remain accessible when the dispenser retainer 200 is engaged with the mounting unit 100.

In the depicted embodiment, the guidance and retention means 170 are used to engage a dispenser retainer 200 which mates with the dispenser 300 (not shown) via attachment means 210 thereby enabling the mounting unit 100 to engage with multiple models of dispensers unit 300. In an alternative embodiment, the guidance and retention means engage the dispenser 300 with the mounting unit 100 directly. In a further embodiment having the dispenser retainer 200, a change in the amount of the consumables within the dispenser affects the distance between a portion of the dispenser retainer and a portion of the mounting plate. As such, the sensor 140 may be a proximity sensor for monitoring the distance between said portions. In such an embodiment, the sensor 140 may be a sound or light based, and may comprise an ultrasonic transducer, a lux sensor or an interferometric sensor.

In use, the dispenser 300 is docked with the mounting unit 100 such that the sensor 140 is able to measure the quantity of the consumables stored within the dispenser 300. The processor 110 produces quantity data from the sensor output and this data is written to memory 120. This data is further communicated to computing means 135 which is configured to monitor the usage of the dispenser 300.

In an embodiment, the display means 150 are used to convey the quantity of consumables directly to the user/custodian including the consumable levels current status. In a further embodiment, the display means 150 could be activated by the user/custodian such that the information is only displayed when required. In an embodiment, this activation is provided via input means 160.

In a preferred embodiment, the processor 110 detects when the quantity of consumables drops below a pre-set threshold and triggers and alert. In an embodiment this alert is communicated to computing means 135. In a further embodiment this alert is displayed on the display means 150. The display of the alert, in one embodiment, is set on a timed basis, such as the periodic flashing to attract the attention of the user/custodian.

In a preferred embodiment, the communication means 135 transmit the consumable level data and a unique identifier from the dispenser assembly 10 to a remote server an intermediary network device such that the data can be collated over time and accessed remotely. In a further embodiment, the combination means 135 transit the data through the network on a periodic basis so as to manage the power requirements of the monitoring system 1.

The collated data is used to generate alerts that are delivered to custodians on or off site and instruct that action needs to be taken at a particular location. These alerts could be delivered via SMS, MMS, email, etc.

In an embodiment, the collated data is be used to monitor other variables such as time from outage to replenishment to help drive the efficiency of the custodian and minimise the time the consumables are not available.

In a further embodiment the collated data is used to create a historical usage trend for each and every dispenser assembly 10 being monitored. This information would provide the monitoring system 1 with knowledge regarding how and when the individual dispenser assemblies 10 are being used, as well as a busyness level for a group of dispenser assemblies 10 as a whole. This information could be used to create more efficient and or better quality servicing schedules.

In a preferred embodiment, historical data is used to generate a prediction on how long the remaining consumable level is likely to last before it is completely depleted—i.e. how long the custodian has to refill the dispenser 300 before it becomes fully empty. This historical usage trend analysis would be by individual dispenser assembly 10 and could be by week, by day, by hour depending on the level of accuracy required.

In an embodiment, the information regarding the prediction of time until the consumable level is completely depleted is also displayed locally on the display means 150. In an embodiment in which the computing means 135 are remote from the dispenser assembly 10, the return flow of information to the dispenser assembly 10 could be triggered by the dispenser assembly 10 transmitting its data in order to remove the need for the communication means 135 to be actively listening and to conserve battery power.

In a further embodiment, the information pertaining to each and every dispenser assembly 10 in a singular washroom complex could also be transmitted to a display located within said washroom complex, such that a custodian is able to ascertain the status of all dispensers 300 prior to starting their activities. This enable the custodian to ensure that they had stock of all the consumables they need prior to starting a shift.

In use, the mounting unit 100 is configured to detect single dispenser usage event by detecting a change in the output of the sensor 140 which indicates an appropriate reduction in the quantity of consumables stored within the dispenser 300. Similarly, the mounting unit 100 is configured to detect refill events by detecting an increase in the quantity of consumables.

In use, the mounting unit 100 is further configured to determine if the dispenser 300 has been removed from the mounting unit 100 by detecting an unloaded output from the sensor 140. In situations where the dispenser 300 has been removed and not replaced within a set time (such as a suitable time for repairing or refilling the dispenser 300), the mounting unit can trigger an alert in the monitoring system 1 that informs a custodian of the potential theft or damage of the dispenser assembly 10. In an embodiment, this set time is measured by the processor 110. In an alternative embodiment, this time is measured by the computing means 135.

Figure 3:
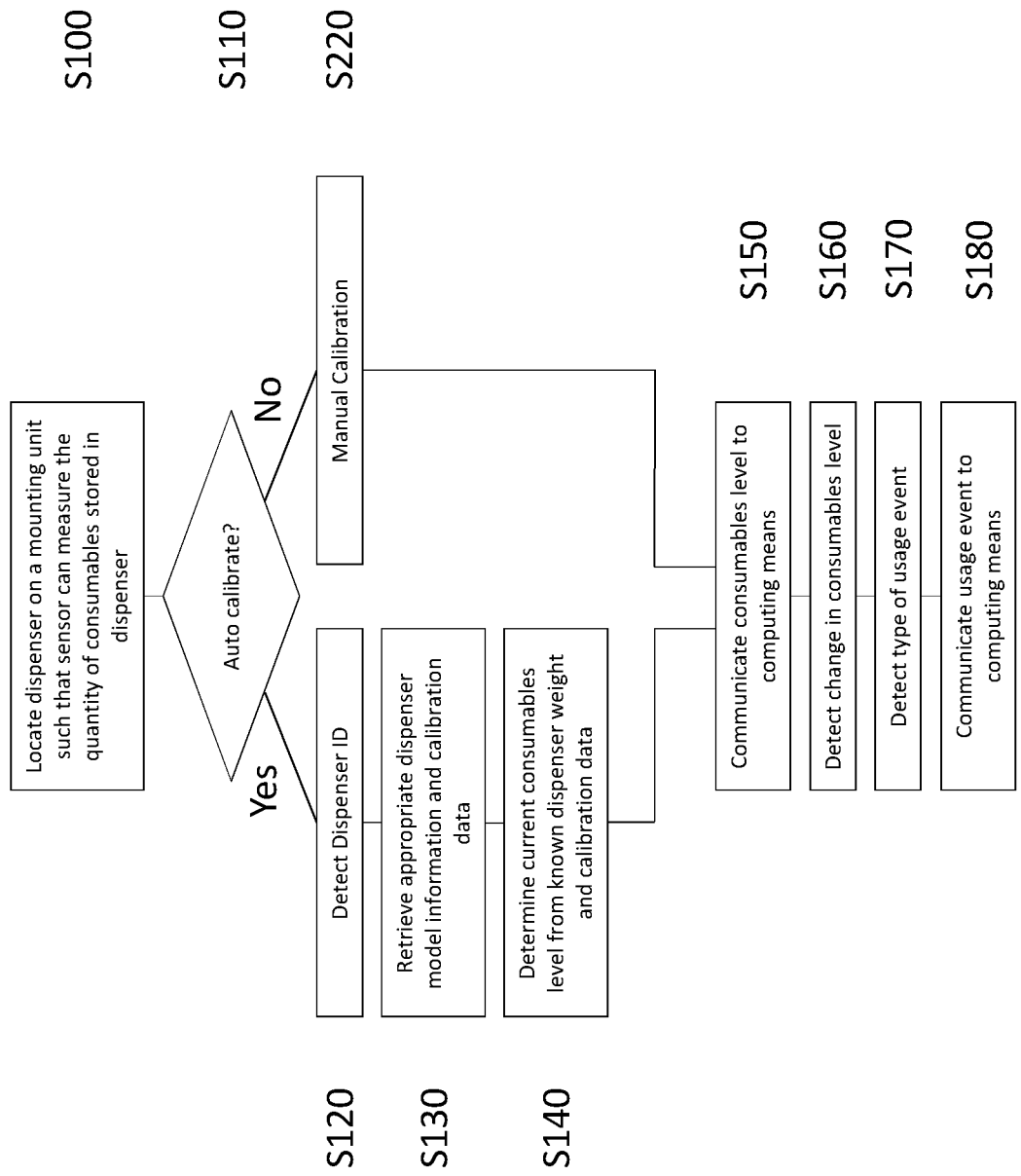
FIG. 3 is a flow chart of the monitoring method in accordance with an embodiment of the invention.

FIG. 3 is a flow chart of the steps performed by the consumables monitoring system in order to detect the change in the amount of a consumable according to an embodiment of the invention.

The process commences at S100 when the dispenser 300 is located on the mounting unit 100. The location of the dispensing unit 300 on the mounting unit 100 allows for the amount of consumable in the dispenser assembly to be determined.

At step S110, the decision is made whether to calibrate the sensor output manually or automatically, to provide a direct reading of the amount of consumables stored within the dispenser.

In some embodiments the calibration aspect is not performed, or is performed on a periodic or event driven basis. In such embodiments the process proceeds directly to step S150.

At step S120, the automatic calibration procedure begins by identifying the dispenser. In an embodiment, this is achieved by the mounting unit 100 reading an RFID chip in or on the dispenser 300. In an alternative embodiment, the dispenser ID may be inputted by a user or custodian using input means 160. In such embodiments, the known parameters of the identified dispenser 300 can be accessed, allowing the sensor 140 to determine the weight of consumables in the dispenser 300 (for example by deducting the known weight of the dispenser 300 in an empty state). In a further embodiment, the dispenser 300 is identified by the sensor 140. In an embodiment in which the sensor 140 detects the combined weight of the dispenser 300 and the consumables stored within the dispenser 300, the dispenser 300 is identified by detecting either the full or empty weight of the dispenser 300, with the mounting unit 100 prompting the user/custodian for input via input means 160 if it necessary to specify the fill state of the dispenser 300.

Accordingly, the consumables monitoring system is able to self-determine the dispenser type, model and/or fill state and perform the necessary calibrations required by the particular dispenser 300. The system is therefore capable of adapting to a wide range of dispensers 300 in different fill stages with minimal setup or modification by a custodian or other user.

Once the dispenser ID has been determined the process continues to step S130.

At step S130, using the dispenser ID, the corresponding calibration data is retrieved from memory 120. In an alternative embodiment, the dispenser ID is be transmitted via communication means 130 which in turn receives the calibration data from a remote server. Once the calibration data has been obtained the process continues to step S140.

At step S140, the quantity of consumables stored within the dispenser 300 is calculated from the calibration data and the sensor data. In an embodiment, the calculated quantity of consumables in the dispenser 300 is displayed on display means 150.

At step S150, the data relating to the quantity of consumables is transmitted to the computing means 135. In an alternative embodiment, the mounting unit 100 may transmit only raw sensor data to the computing means 135, with the computing means 135 applying the calibration itself.

At step S160, the monitoring system 1 detects a change in the quantity of consumables stored in the dispenser 300 following a change in the output of the sensor 140, which is in turn used to update the recorded quantity of consumables in the dispenser 300, the updated quantity being transmitted to the computing means 135.

At step S170, based on the sign and the magnitude of the change in quantity of consumables stored in the dispenser 300, the usage event is categorized as one of a regular usage event, a full refill event or a partial refill event. This categorization can occur at the mounting unit 300 and be communicated externally via communication means 135, or it may be performed after the raw data has been transmitted to the computing means 135.

At step S180, the type of usage event, along with the current quantity of consumables stored in the dispenser 300 is communicated via communication means 130 to computing means 135. Computing means 135 thereby keeps a record of the usage history of the dispenser assembly 10. In an embodiment, a record of usage events is also kept in memory 120.

In an embodiment, the decision at step S110 is based on availability of data in local or external memory, an overriding input from user/custodian or direction from the computing means 135. In a further embodiment, a user or custodian manually select from available calibration data.

If at step S110 a decision is made not to initiate the auto calibration procedure, a manual calibration procedure takes place during step S220, where step S220 is an alternative to steps S120, S130 and S140. In an embodiment, the manual calibration procedure involves prompting the user via display means 150 to locate the dispenser 300 on the mounting unit 100 whilst the dispenser 300 is empty of consumables and again when the dispenser 300 is full. The processor 110 then interpolates this data to provide a conversion between the output of the sensor 140 and the relative fill state of the dispenser 300. This calibration method thus takes into account any residual packaging that would remain in the dispenser once the consumables have been depleted.

Optionally, the computing means 135 trigger an alert when the measured quantity of consumables stored in the dispenser 300 falls below a pre-set threshold. In an embodiment, this alert triggers a refill event. In an embodiment, this alert is communicated externally by communication means 130. In a further embodiment, this alert is communicated via display means 150.

Optionally, sensor 140 is provided by a plurality of individual sensors each having an optimum range of inputs over which they are most sensitive. In this embodiment, the processor 110 is configured to select the optimal sensor for use with the detected dispenser 300 and consumables load. Said inputs are one or more of the overall weight of the dispenser and consumables, the weight of the consumables held in said dispenser, the amount of consumables, the fill level of dispenser and the type of consumable detected. In an embodiment, the plurality of sensors have overlapping ranges across which they are most sensitive. In a further embodiment, one or more of the plurality of sensors may be better suited to measuring a particular type of consumable, such that when the consumable is known (either by automatic recognition or user input), the appropriate sensor is monitored.

Therefore, there is provided a consumables monitoring system capable of monitoring the usage and fill level of a range of dispensers stocking a range of consumables.

The invention claimed is:
1. A consumables monitoring system comprising
   a dispenser mounting assembly in communication with a processor,
   wherein the dispenser mounting assembly comprises a mounting unit, a dispenser retainer configured to receive a dispenser, and a plurality of sensors;
   wherein the plurality of sensors, mounting unit and dispenser retainer are arranged such that one or more of the plurality of sensors can monitor a quantity of a consumable stored in the dispenser received by the dispenser retainer,
   wherein the dispenser mounting assembly is configured to communicate sensor data to the processor,
   wherein the processor is configured to monitor a usage of the dispenser mounting assembly using the sensor data, and
   wherein one or more of the plurality of sensors is configured to detect a type of consumable stored in a dispenser received by the dispenser retainer and the dispenser mounting assembly is configured to select a sensor from the plurality of sensors to monitor the quantity of the consumable stored in the dispenser received by the dispenser retainer dependant on the detected type of the consumable.

2. The system of claim 1, further comprising a dispenser received by and attached to the dispenser retainer.

3. The system of claim 2, wherein inputs measured by the plurality of sensors are one or more of overall weight of said dispenser and a consumable stored in said dispenser, weight of the consumable stored in said dispenser, amount of consumable stored in said dispenser, fill level of the dispenser, or the detected type of the consumable.

4. The system of claim 1, wherein at least one of the plurality of sensors is one of a force sensing resistor, strain gauge, load cell, or spring switch.

5. The system of claim 1, wherein at least one of the plurality of sensors is mounted on the mounting unit or on the dispenser retainer.

6. The system of claim 1, wherein the dispenser retainer is sized such that the dispenser received by the dispenser retainer is completely contained within extents of the dispenser retainer.

7. The system of claim 1, further comprising a RF transceiver.

8. The system of claim 1, further comprising a display for visually indicating a level of the consumable in the dispenser received by the dispenser retainer.

9. The system of claim 1, further comprising a user input for indicating a type of recent event, or a stage in a calibration process.

10. The system of claim 1, wherein the processor is provided by a remote server or is integrated into the dispenser mounting assembly.

11. A dispenser mounting assembly for a dispenser of a consumable, the dispenser mounting assembly comprising:
   a mounting unit for attaching the assembly to a surface,
   a dispenser retainer configured to receive a dispenser of a consumable, and
   a sensor,
   wherein the mounting unit is configured to operably engage the dispenser retainer,
   wherein the sensor, mounting unit and dispenser retainer are configured such that a combined mass of the dispenser retainer and the received consumable dispenser is measured by the sensor, and
   wherein the mounting assembly further comprises one or more additional sensors,
   wherein one or more of the sensor and the one or more additional sensors is configured to detect a type of the consumable stored in the received consumable dispenser, and
   the dispenser mounting assembly is configured to select one or more sensors from the sensor and the one or more additional sensors to monitor a quantity of the consumable stored in the received consumable dispenser dependant on the type of the consumable detected.

12. The dispenser mounting assembly of claim 11, wherein at least one of the sensor and the one or more additional sensors is one of a force sensing resistor, strain gauge, load cell, or spring switch.

13. The dispenser mounting assembly of claim 11, wherein at least one of the sensor and the one or more additional sensors is mounted on the mounting unit or on the dispenser retainer.

14. The dispenser mounting assembly of claim 11, wherein the dispenser retainer is sized such that the dispenser received by the dispenser retainer is completely contained within extents of the dispenser retainer.

15. The dispenser mounting assembly of claim 11, further comprising a RF transceiver.

16. The dispenser mounting assembly of claim 11, further comprising a display for visually indicating a level of the consumable in the dispenser received by the dispenser retainer.

17. The dispenser mounting assembly of claim 11, further comprising a user input for indicating a type of recent event, or a stage in a calibration process.

18. The dispenser mounting assembly of claim 11, wherein inputs measured by the sensor and the one or more additional sensors are one or more of overall weight of a dispenser currently received by the dispenser retainer and consumables, weight of the consumable stored in the dispenser currently received by the dispenser retainer, amount of the consumable, fill level of the dispenser currently received by the dispenser retainer, or detected type of the consumable stored in the dispenser currently received by the dispenser retainer.

19. A method for monitoring consumables within a dispenser mounting assembly, said dispenser mounting assembly comprising a mounting unit, a dispenser retainer configured to receive a dispenser of a consumable, and a plurality of sensors, wherein one or more of the plurality of sensors is configured to detect a type of the consumable stored in the received consumable dispenser, the dispenser mounting assembly is configured to select one or more sensors from the plurality of sensors to monitor a quantity of the consumable stored in the received consumable dispenser dependant on the type of the consumable detected,
   the method comprising steps of:
      at the dispenser mounting assembly, detecting a type of consumable stored in a received consumable dispenser;
      selecting one or more sensors of the plurality of sensors to monitor a quantity of a consumable stored in the received consumable dispenser dependant on the type of the consumable detected; and
      communicating sensor data of the one or more selected sensors to a processor, wherein the processor is configured to monitor a usage of the dispenser assembly using sensor data.

* * * * *